United States Patent
Takada et al.

(10) Patent No.: US 7,624,268 B2
(45) Date of Patent: Nov. 24, 2009

(54) DEVICE AND METHOD FOR MANAGING PUBLIC KEY CERTIFICATE ATTACHED TO ELECTRONIC MAIL AND STORAGE MEDIUM

(75) Inventors: Makoto Takada, Ebina (JP); Takanori Masui, Ebina (JP); Masato Sugii, Kawasaki (JP); Nobumi Kusano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 738 days.

(21) Appl. No.: 11/268,357

(22) Filed: Nov. 7, 2005

(65) Prior Publication Data

US 2007/0061576 A1    Mar. 15, 2007

(30) Foreign Application Priority Data

Aug. 26, 2005  (JP)  ............................. 2005-245374

(51) Int. Cl.
*H04L 9/00*  (2006.01)
(52) U.S. Cl. ....................................... 713/168; 713/173
(58) Field of Classification Search ................. 713/168, 713/170–173, 178, 175; 726/1–4, 10; 380/227, 380/282, 285
See application file for complete search history.

(56) References Cited

U.S. PATENT DOCUMENTS 6,055,236 A * 4/2000 Nessett et al. ............... 370/389
6,842,449 B2 * 1/2005 Hardjono .................... 370/352

FOREIGN PATENT DOCUMENTS

JP    10020779    1/1998

* cited by examiner

*Primary Examiner*—Hosuk Song
(74) *Attorney, Agent, or Firm*—Gauthier & Connors LLP

(57) ABSTRACT

A certificate managing device has a verifying section that verifies validity of a first public key certificate corresponding to a originating mail address when an electronic mail to which the first public key certificate is attached is received, a comparing section that compares newness of the first public key certificate with newness of a second public key certificate which is already registered as a public key certificate corresponding to the originating mail address, and a registering section that registers the first public key certificate as the public key certificate corresponding to the originating mail address in place of the second public key certificate when the first public key certificate is more recent than the second public key certificate.

19 Claims, 3 Drawing Sheets

DEVICE AND METHOD FOR MANAGING PUBLIC KEY CERTIFICATE ATTACHED TO ELECTRONIC MAIL AND STORAGE MEDIUM

BACKGROUND

1. Technical Field

The present invention relates to a technique for managing a public key certificate attached to an electronic mail to be received.

2. Related Art

Public key encryption is widely in use in encryption of data to be transmitted through a network and a digital signature. Japanese Patent Laid-Open Publication No. Hei 10-20779 discloses a technique of smoothly decoding data encrypted using a past key after the key has been changed and a technique for smoothly verifying data digitally signed using the past key. The technique is targeted to changing the keys without inconvenience and allows verification of a digital signature using an old public key when an electronic mail having an old transmission time is received. Although this technique is convenient, when an electronic mail in which the time of the electronic mail is intentionally changed is transmitted, an old public key is used which is not desirable from the point of view of security. In addition, in this technique, when update to a new public key is performed, information on the electronic mail on which the update is based is not recorded, and therefore, if the public key is automatically updated based on a mail with a harmful intent and a problem occurs, it is not possible to review the past transaction to search for a cause of the problem.

SUMMARY

According to one aspect of the present invention, there is provided a certificate managing device having a verifying section that verifies validity of a first public key certificate corresponding to an originating mail address when an electronic mail to which the first public key certificate is attached is received, a comparing section that compares newness of the first public key certificate with newness of a second public key certificate which is already registered as a public key certificate corresponding to the originating mail address when the validity of the first public key certificate is verified, and a registering section that registers the first public key certificate as the public key certificate corresponding to the originating mail address in place of the second public key certificate when the first public key certificate is more recent than the second public key certificate.

According to another aspect of the present invention, there is provided a storage medium. The storage medium has verifying validity of a first public key certificate corresponding to an originating mail address when an electronic mail to which the first public key certificate is attached is received, comparing newness of the first public key certificate with newness of a second public key certificate which is already registered as a public key certificate corresponding to the originating mail address when the validity of the first public key certificate is verified, and registering the first public key certificate as the public key certificate corresponding to the originating mail address in place of the second public key certificate when the first public key certificate is more recent than the second public key certificate.

According to another aspect of the present invention, there is provided a method. The method has verifying validity of a first public key certificate corresponding to an originating mail address when an electronic mail to which the first public key certificate is attached is received, comparing newness of the first public key certificate with newness of a second public key certificate which is already registered as a public key certificate corresponding to the originating mail address when the validity of the first public key certificate is verified, and registering the first public key certificate as the public key certificate corresponding to the originating mail address in place of the second public key certificate when the first public key certificate is more recent than the second public key certificate.

BRIEF DESCRIPTION OF THE DRAWINGS

An embodiment of the present invention will be described in detail based on the following figures, wherein.

DETAILED DESCRIPTION

An embodiment of the present invention will be described below with reference to an example in which the invention is used.

Figure 1:
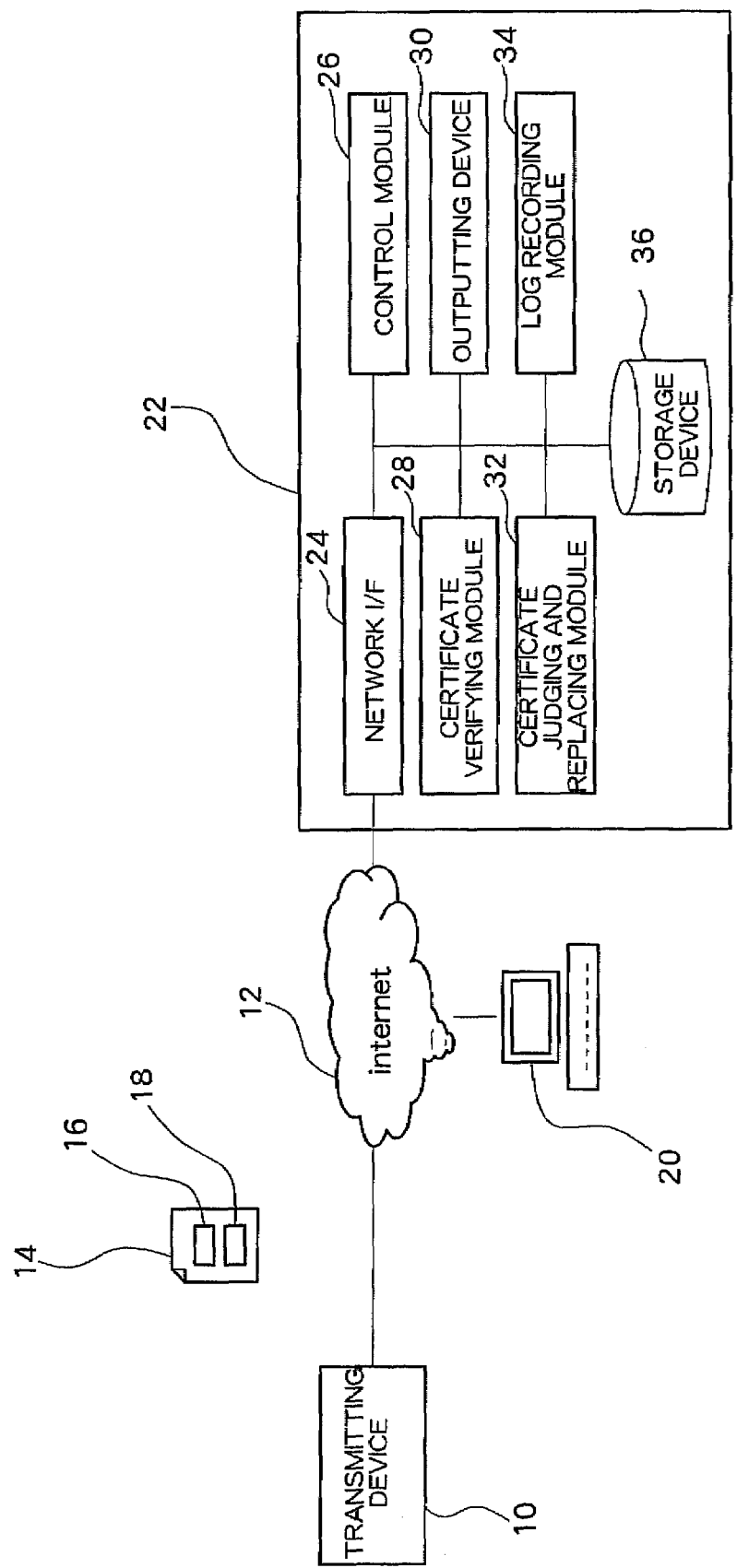
FIG. 1 is a block diagram showing an example structure of a system according to a preferred embodiment of the present invention.

FIG. 1 is a block diagram showing an example structure of a system according to the present embodiment. A transmitting device 10 is a PC or a device having a multifunction machine and is connected to the Internet 12. In the present system, the transmitting device 10 has a function to create an electronic mail 14 and transmit the electronic mail 14 via the Internet to a transmission destination. A digital signature 16 is attached to the electronic mail 14 and a public key certificate 18 corresponding to a private key used in making the digital signature 16 is attached to the electronic mail 14. The public key certificate 18 is created with respect to an originating mail address of the electronic mail 14 and is normally issued by a certification authority 20 on the Internet 12 which is already determined as reliable.

A multifunction machine 22 is a device which is a transmission destination of the electronic mail 14. In the multifunction machine 22, multiple electronic mail addresses can be set corresponding to the administrator and multiple users. In addition to elements for realizing the functions of a scanner, a printer, and a facsimile, the multifunction machine 22 has a network I/F (interface) 24, a control module 26, a certificate verifying module 28, an outputting device 30, a certificate judging and replacing module 32, a log recording module 34, and a storage device 36. These elements are elements formed by a combination of hardware and software.

The network I/F 24 is provided for transmission and reception of data and receives the electronic mail 14. The control module 26 extracts an originating mail address and the public key certificate 18 from the received electronic mail 14. The certificate verifying module 28 verifies validity of the extracted public key certificate 18. During the verification of validity, the certificate verifying module 28 accesses the certification authority 20 via the network I/F 24 as necessary and obtains necessary information. The outputting device 30 is formed by a liquid crystal display or the like and displays the electronic mail 14 according to a setting and also displays results of various processes.

The certificate judging and replacing module 32 functions when the certificate verifying module 28 determines that the public key certificate 18 is valid. More specifically, the certificate judging and replacing module 32 performs a search for a public key certificate in a certificate store provided within the storage device 36 using the originating mail address as a key for the search. When the public key certificate is not found, the public key certificate 18 is registered in the certificate store in correspondence to the mail address. On the other hand, when a public key certificate is found, the public key certificate 18 is compared with the public key certificate which has been found and the certificate judging and replacing module 32 judges which certificate is more recent in view of the period of validity. When the certificate judging and replacing module 32 judges that the public key certificate 18 is more recent, the certificate judging and replacing module 32 deletes the public key certificate registered in the certificate store and newly stores and registers the public key certificate 18 in the certificate store. In other words, the certificate judging and replacing module 32 replaces the public key certificate in the certificate store.

The log recording module 34 records, in a log within the storage device 36, information regarding the public key certificate 18 and information regarding the corresponding electronic mail 14 when a new public key certificate 18 is registered in the certificate store. For example, header information of the electronic mail 14 is used as the information regarding the electronic mail 14. In this manner, it is possible to trace information of the transmitting station and the transmitting person of the electronic mail 14 which prompted the replacement. The user can refer to the log using the outputting device 30.

Figure 2:
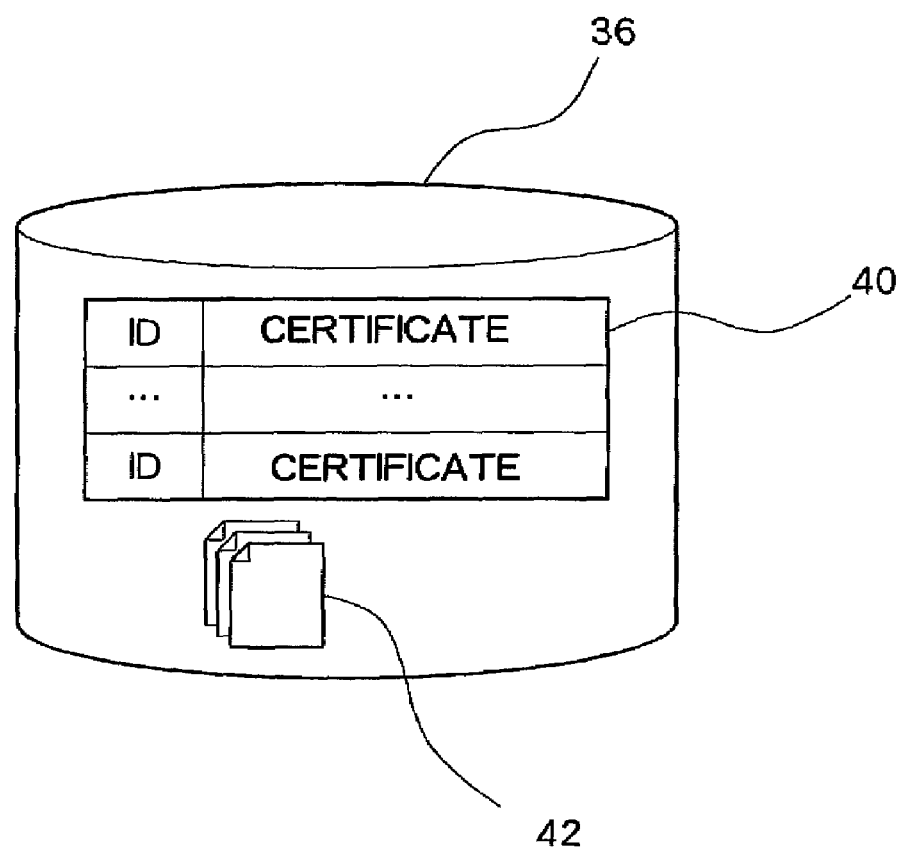
FIG. 2 is a diagram for explaining an example of data stored in a storage device.

FIG. 2 is a schematic view explaining details of the storage device 36. The storage device 36 is a data storage region which is realized using a hard disk drive, a semiconductor memory, or the like. The storage device 36 has a certificate store 40 and a log 42. The certificate store 40 is provided in order to register and store a mail address as an identifier and a public key certificate in correspondence to each other. Only one public key certificate is registered with respect to one mail address. Therefore, when the public key certificate is replaced, signing and verification using an old public key certificate cannot be performed. In the log 42, identification information of a public key certificate and header information of the corresponding electronic mail are recorded when the public key certificate is registered in the certificate store.

Figure 3:
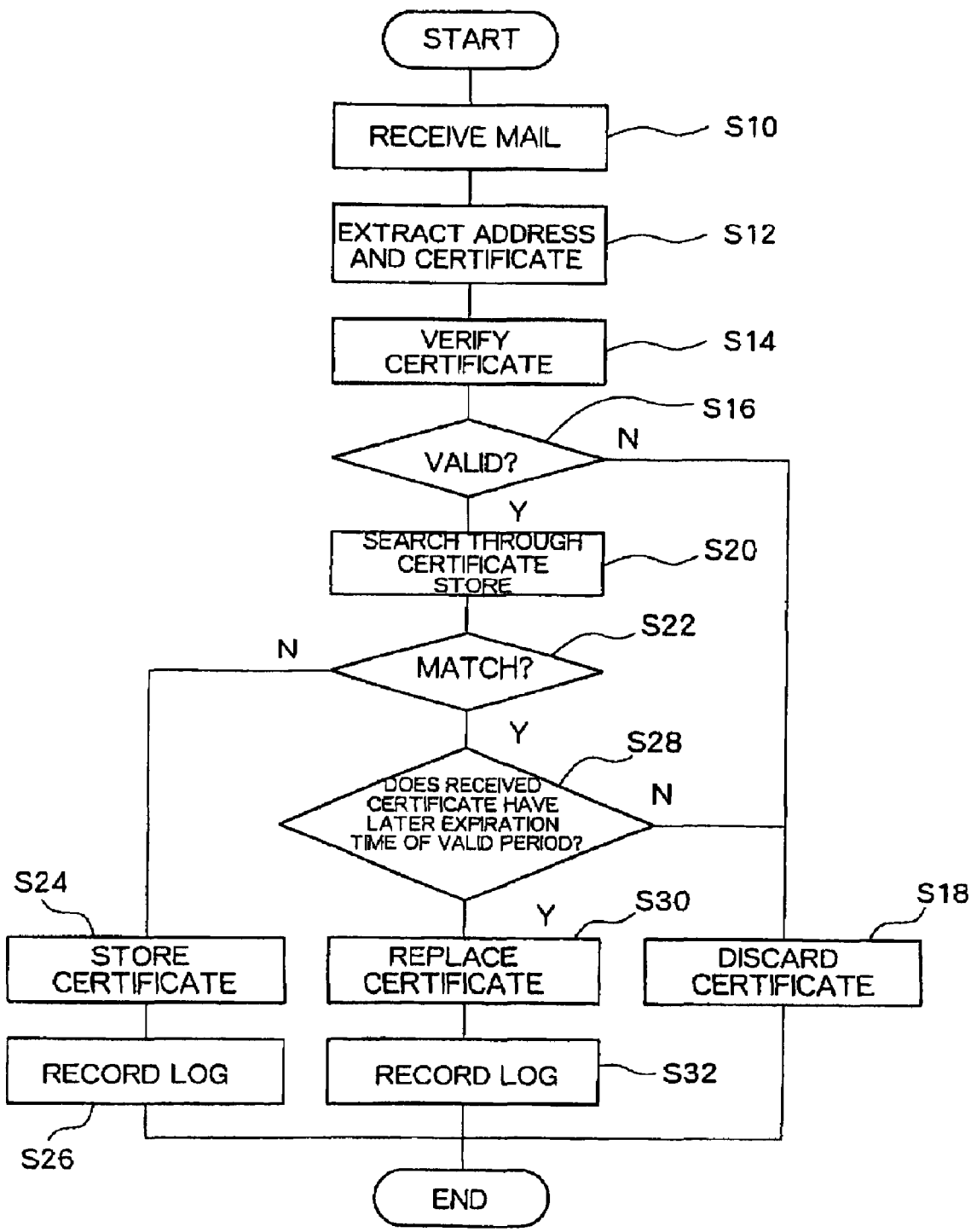
FIG. 3 is a flowchart for explaining an example process in a multifunction machine.

Next, a flow of a process operation in the multifunction machine 22 will be explained using a flowchart of FIG. 3. When the electronic mail 14 is received by the network I/F 24 (S10), the control module 26 extracts the originating mail address and the public key certificate 18 which is attached to the electronic mail. Then, the certificate verifying module 28 accesses the certification authority 20 as necessary to verify the public key certificate and determines the validity of the public key certificate (S16). When it is determined as a result that the public key certificate 18 is not valid, the public key certificate 18 is discarded (S18) and the process is completed. It is also possible to record a log of the corresponding electronic mail 14 as necessary.

On the other hand, when it is determined that the public key certificate 18 is valid, the certificate store 40 of the storage device 36 is searched and it is determined whether or not a public key certificate matching the originating mail address is stored (S22). When a matching public key certificate is not found, the public key certificate 18 is stored in the certificate store 40 (S24) and a record regarding the electronic mail 14 or the like is stored (S26).

When a matching public key certificate is found in the certificate store 40, an expiration time for validity of the public key certificate 18 attached to the received electronic mail 14 is compared with that of the public key certificate stored in the certificate store 40 (S28). When the public key certificate 18 has an earlier expiration time for the validity, the public key certificate 18 is discarded (S18) and a log regarding the corresponding electronic mail 14 is recorded as necessary. On the other hand, when the public key certificate 18 has a later expiration time for validity, the old public key certificate stored in the certificate store 40 is replaced by the public key certificate 18 (S30) and a record regarding the electronic mail 14 or the like is recorded (S32).

As a result of this process, a valid and new public key certificate is stored in the certificate store 40 and old public key certificate can no longer be used. Because of this, a process using the old public key certificate, the use of which should be avoided, is not performed and the security can be improved. In addition, when there is a problem with the public key certificate stored in the certificate store 40, the cause of the problem can be found by analyzing the log 42.

Next, various modifications of the embodiment of the present invention will be described.

In one embodiment of the present invention, the certificate managing device can be realized by controlling hardware having a calculation function using software (program). More specifically, it is possible, for example, to use a general PC (personal computer) or a multifunction machine having a function to receive (and transmit) an electronic mail (for example, a device in which two or more of a scanner, a printer, and a facsimile are integrally provided) as the certificate managing device.

The certificate managing device is a device which manages the public key certificate attached to an electronic mail. The certificate managing device may obtain the electronic mail by having a function to receive an electronic mail or may obtain, through file transfer or the like, the electronic mail which is separately received. The certificate managing device applies verification, comparison and registration to the obtained electronic mail. These processes are desirably applied after the electronic mail is received and before the public key certificate which is already managed is used. In other words, it is desirable for the managed public key certificate to be maintained at a most recent state which can be realized at that point.

The verifying section verifies validity of the first public key certificate. The first public key certificate is a public key certificate attached to an electronic mail and corresponds to the originating mail address of the electronic mail. The verification may be performed by, for example, accessing the certification authority via a network or may be performed using stored information for verification.

The comparing section compares newness of the first public key certificate with newness of a second public key certificate when the validity of the first public key certificate is verified. The second public key certificate is a public key certificate which is registered as a public key certificate corresponding to the originating mail address. The newness is determined not based on the newness of the time of acquisition of the public key certificate, but based on the newness regarding the validity of the public key certificate.

The registering section registers the first public key certificate as the public key certificate corresponding to the originating mail address in place of the second public key certificate when the first public key certificate is more recent than the second public key certificate. In other words, after the first public key certificate is newly registered, the first public key certificate is used as the public key certificate corresponding to the originating mail address and the second public key certificate is no longer recognized as the public key certificate corresponding to the originating mail address. The second public key certificate may be deleted or invalidated without deletion.

According to this configuration, only a new public key certificate corresponding to the mail address of the originating of the electronic mail is valid and old public key certificates become unusable. Therefore, it is possible to avoid a situation, for example, in which authentication is performed using an old public key certificate when an electronic mail in which the time is intentionally changed is received, and consequently, degradation in security can be prevented.

In another embodiment of the present invention, in the certificate managing device, the comparing section compares the newness of the first and second public key certificates based on expiration times of valid periods of the first and second public key certificates. In other words, the comparing section determines that the public key certificate with a later expiration time is a more recent public key certificate. In another embodiment of the present invention, in the certificate managing device, the comparing section compares the newness of the first and second public key certificates based on start times of valid periods of the first and second public key certificates. In other words, the comparing section determines a public key certificate with a later start time as a more recent public key certificate.

In another embodiment of the present invention, the certificate managing device has a recording section that records, when the registering section registers the first public key certificate, information for identifying a transmitting station or a transmitting person which or who has transmitted the electronic mail to which the first public key certificate is attached. With this structure, when a problem arises regarding falsification and fraud of a new public key certificate after the public key certificate is replaced with the new public key certificate, the cause can be traced. The information to be recorded may be, for example, reception time of the mail (to which the first public key certificate is attached), execution time of registration (of the first public key certificate), a mail address of the originator (of the mail to which the first public key certificate is attached), an issuer DN (domain name) of the (first public key) certificate, or a serial number of the (first public key) certificate.

In another embodiment of the present invention, in the certificate managing device, the recording section records a mail header or a message identifier of the electronic mail to which the first public key certificate is attached. The mail header and the message identifier of the electronic mail are very useful for identifying the transmitting station or a transmitting person of the electronic mail. In addition, even when these items of information have been manipulated, the information are important keys to identifying the true transmitting station and true transmitting person.

The complete disclosure of Japanese Patent Application No. 2005-245374 filed on Aug. 26, 2005, including the specification, claims, drawings, and abstract, is incorporated herein by reference.

What is claimed is:

1. A public key certificate managing device comprising:
a verifying section that verifies validity of a first public key certificate corresponding to an originating mail address when an electronic mail to which the first public key certificate is attached is received;
a comparing section that compares newness of the first public key certificate with newness of a second public key certificate which is already registered as a public key certificate corresponding to the originating mail address; and
a registering section that registers the first public key certificate as the public key certificate corresponding to the originating mail address in place of the second public key certificate when the first public key certificate is more recent than the second public key certificate.

2. The public key certificate managing device according to claim 1, wherein the comparing section compares the newness of the first and second public key certificates based on expiration times of valid periods of the first and the second public key certificates.

3. The public key certificate managing device according to claim 1, wherein the comparing section compares the newness of the first and second public key certificates based on start times of valid periods of the first and second public key certificates.

4. The public key certificate managing device according to claim 1, further comprising a recording section that records information for identifying a transmitting station or a transmitting person which or who has transmitted the electronic mail to which the first public key certificate is attached.

5. The public key certificate managing device according to claim 4, wherein the recording section records a mail header or a message identifier of the electronic mail to which the first public key certificate is attached.

6. The public key certificate managing device according to claim 1, wherein the registering section deletes the second public key certificate from the public key certificate managing device when the registering section registers the first public key certificate.

7. The public key certificate managing device according to claim 1, wherein the registering section invalidates the second public key certificate without deleting the second public key certificate from the public key certificate managing device when the registering section registers the first public key certificate.

8. The public key certificate managing device according to claim 1, wherein the functions of the verifying section, the comparing section, and the registering section are executed after the electronic mail to which the first public key certificate is attached is received and before the second public key certificate which is already registered is used.

9. The public key certificate managing device according to claim 1, wherein a number of the second public key certificate which is already registered is one or zero for each originating mail address, and the comparing section searches for the public key certificate which is already registered using the originating mail address as a search key.

10. A storage medium readable by a computer, the storage medium storing a program of instructions executable by the computer to perform a function comprising:
verifying validity of a first public key certificate corresponding to an originating mail address when an electronic mail to which the first public key certificate is attached is received;
comparing newness of the first public key certificate with newness of a second public key certificate which is already registered as a public key certificate corresponding to the originating mail address; and
registering the first public key certificate as the public key certificate corresponding to the originating mail address in place of the second public key certificate when the first public key certificate is more recent than the second public key certificate.

11. The storage medium according to claim 10, wherein the newness of the first public key certificate and the newness of the second public key certificate are compared based on expiration times of valid periods of the first and second public key certificates.

12. The storage medium according to claim 10, wherein the newness of the first public key certificate and the newness of the second public key certificate are compared based on start times of valid periods of the first and second public key certificates.

13. The storage medium according to claim 10, further comprising recording information for identifying a transmitting station or a transmitting person which or who has transmitted the electronic mail to which the first public key certificate is attached.

14. The storage medium according to claim 13, wherein a mail header or a message identifier of the electronic mail to which the first public key certificate is attached is recorded.

15. A public key certificate managing method comprising:
    verifying validity of a first public key certificate corresponding to an originating mail address when an electronic mail to which the first public key certificate is attached is received;
    comparing newness of the first public key certificate with newness of a second public key certificate which is already registered as a public key certificate corresponding to the originating mail address, and
    registering the first public key certificate as the public key certificate corresponding to the originating mail address in place of the second public key certificate when the first public key certificate is more recent than the second public key certificate.

16. The method according to claim 15, wherein the newness of the first public key certificate and the newness of the second public key certificate are compared based on expiration times of valid periods of the first and second public key certificates.

17. The method according to claim 15, wherein the newness of the first public key certificate and the newness of the second public key certificate are compared based on start times of valid periods of the first and second public key certificates.

18. The method according to claim 15, further comprising recording information for identifying a transmitting station or a transmitting person which or who has transmitted the electronic mail to which the first public key certificate is attached.

19. The method according to claim 18, wherein a mail header or a message identifier of the electronic mail to which the first public key certificate is attached is recorded.

* * * * *